United States Patent [19]

Werner et al.

[11] Patent Number: 6,064,949

[45] Date of Patent: *May 16, 2000

[54] METHOD AND APPARATUS FOR CONTROLLING A SCREENING DEVICE BASED ON MORE THAN ONE SET OF FACTORS

[75] Inventors: Walter Werner, Dornbirn; Günther Sejkora, Schwarzenberg; Joachim Geiginger, Hohenems, all of Austria; Manuel Bauer, Mathod, Switzerland; André Faist, Tolochenaz, Switzerland; Nicolas Morel, Ecublens, Switzerland; Jean-Louis Scartezzini, Lausanne, Switzerland; Walter Hegetschweiler, Steinhausen, Switzerland

[73] Assignee: Zumtobel Licht GmbH, Dornbirn, Austria

[*] Notice: This patent issued on a continued prosecution application filed under 37 CFR 1.53(d), and is subject to the twenty year patent term provisions of 35 U.S.C. 154(a)(2).

[21] Appl. No.: 08/807,598

[22] Filed: Feb. 27, 1997

[30] Foreign Application Priority Data

Feb. 29, 1996 [DE] Germany ............. 296 09 127 U
Jun. 3, 1996 [DE] Germany ............. 196 22 253

[51] Int. Cl.[7] .................................................. G06F 9/00
[52] U.S. Cl. ............. 702/134; 702/40; 702/130; 702/136; 250/214 AL; 250/214 C; 700/299; 700/300
[58] Field of Search .................. 364/506, 505, 364/511, 137, 141, 144, 145, 146, 153, 154, 188, 524, 550, 551.01, 557, 579, 580, 581, 806, 400, 528.09, 528.1, 528.11, 528.12, 528.13, 528.34, 528.35; 362/276, 802; 126/701, 702, 572, 585, 603; 374/29, 30, 108, 109; 315/149–155, 157, 159; 307/117; 250/205, 214 AL, 214 B, 214 S, 203.4; 165/254, 257; 236/46 R, 9 R, 9 A, 49.3, 78 D; 340/540, 567, 573, 578, 581, 584, 600, 655, 520–525; 395/3, 61, 931; 160/5; 702/1, 2, 40, 49, 99, 130, 134, 136; 706/900, 930, 931; 700/299, 300

[56] References Cited

U.S. PATENT DOCUMENTS

| | | | |
|---|---|---|---|
| 4,020,897 | 5/1977 | Enter | 165/12 |
| 4,727,918 | 3/1988 | Schroeder | 160/5 |
| 4,881,219 | 11/1989 | Jacquel | 364/400 |
| 5,148,977 | 9/1992 | Hibino et al. | 236/49.3 |
| 5,237,169 | 8/1993 | Grehant | 250/214 AL |
| 5,250,799 | 10/1993 | Werner | 250/214 AL |
| 5,532,560 | 7/1996 | Element et al. | 160/5 |
| 5,663,621 | 9/1997 | Popat | 250/203.4 |

FOREIGN PATENT DOCUMENTS

| | | |
|---|---|---|
| 0405149A2 | 1/1991 | European Pat. Off. . |
| 0521818A1 | 1/1993 | European Pat. Off. . |
| 0659035A1 | 12/1994 | European Pat. Off. . |
| 0659035 | 6/1995 | European Pat. Off. . |
| 2500647 | 7/1975 | Germany . |
| 9412900U1 | 11/1995 | Germany . |
| WO86/04382 | 7/1986 | WIPO . |

OTHER PUBLICATIONS

Sang–Gu Lee, et al., "A Fuzzy Venetian Blind Controller—Hardware Implementation", Proceedings of the Conference on Fuzzy Systems, Orlando, Jun. 26–29, 1994, IEEE, pp. 1197–1202, XP000518392.

Marcelo Hoffmann, "Technology, Profile Fuzzy Logic", SRI International, 1994, pp.1–33 (Jun. 1994).

*Primary Examiner*—Hal Wachsman
*Attorney, Agent, or Firm*—Fitzpatrick, Cella, Harper & Scinto

[57] ABSTRACT

A screening device (3) for screening exterior light (2) which illuminates a room (1), is controlled such that in the room on the one hand, user comfort with regard to freedom from dazzling and room temperature is optimal and, on the other hand, energy consumption for artificial lighting within the room or for heating and cooling the room is minimized.

34 Claims, 4 Drawing Sheets

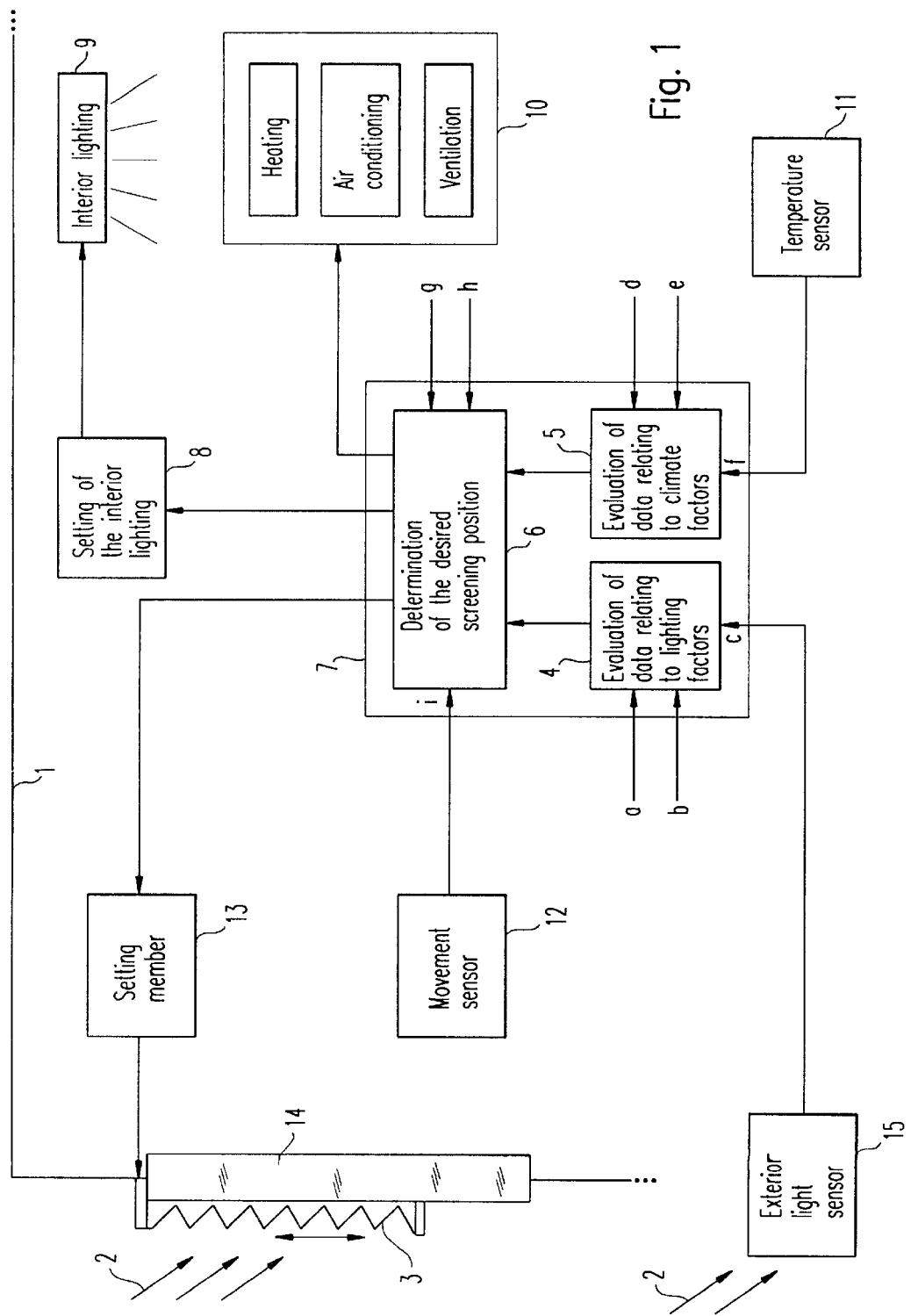

Fig. 2a

| Interior temperature | Radiation intensity | Actual position of the screening device | Movement of the screening device |
|---|---|---|---|
| cold | low | closed | unchanged |
| pleasant | low | closed | somewhat upwards |
| warm | low | closed | upwards |
| cold | medium | closed | somewhat upwards |
| pleasant | medium | closed | somewhat upwards |
| warm | medium | closed | somewhat upwards |
| cold | high | closed | upwards |
| pleasant | high | closed | somewhat upwards |
| warm | high | closed | unchanged |
| cold | low | medium | downwards |
| pleasant | low | medium | somewhat downwards |
| warm | low | medium | upwards |
| cold | medium | medium | somewhat upwards |
| pleasant | medium | medium | unchanged |
| warm | medium | medium | somewhat upwards |
| cold | high | medium | upwards |
| pleasant | high | medium | somewhat downwards |
| warm | high | medium | downwards |
| cold | low | open | downwards |
| pleasant | low | open | somewhat downwards |
| warm | low | open | unchanged |
| cold | medium | open | somewhat downwards |
| pleasant | medium | open | somewhat downwards |
| warm | medium | open | somewhat downwards |
| cold | high | open | unchanged |
| pleasant | high | open | somewhat downwards |
| warm | high | open | downwards |

Fig. 2b

| Exterior temperature | Heating Power | Movement of the screening device |
|---|---|---|
| cold | negative | upwards |
| cold | zero | unchanged |
| cold | positive | downwards |
| pleasant | negative | somewhat upwards |
| pleasant | zero | unchanged |
| pleasant | positive | somewhat downwards |
| warm | negative | downwards |
| warm | zero | unchanged |
| warm | positive | upwards |

Fig. 2c

| Radiation intensity | Heating Power | Weighting |
|---|---|---|
| low | negative | important |
| low | zero | not important |
| low | positive | very important |
| medium | negative | important |
| medium | zero | not important |
| medium | positive | very important |
| high | negative | very important |
| high | zero | important |
| high | positive | very important |

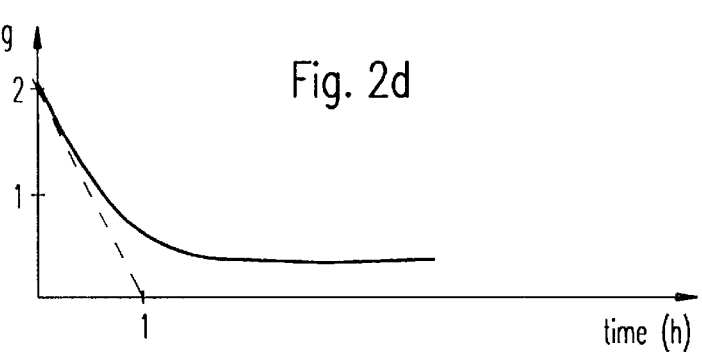

| Season | Heating Power | | |
|---|---|---|---|
| | negative | zero | positive |
| Winter | negative (*) | positive | very positive |
| Transitional period | negative | somewhat positive | positive |
| Summer | negative | zero or negative | somewhat positive(*) |

Desired thermal power balance of the window in dependence on the season of the year and the heating power

Fig. 3b

| Angle of incidence | Direct radiation intensity | | | |
|---|---|---|---|---|
| | low | medium | high | very high |
| low | open | half closed | closed | closed |
| medium | open | half open | half closed | half closed |
| high | open | open | open | open |

Position of the screening device with less diffuse light intensity

Fig. 3c

| Angle of incidence | Direct radiation intensity | | | |
|---|---|---|---|---|
| | low | medium | high | very high |
| low | half closed | half closed | closed | closed |
| medium | half closed | half closed | half closed | half closed |
| high | half closed | half closed | half closed | half closed |

Position of the screening device with more diffuse light intensity

METHOD AND APPARATUS FOR CONTROLLING A SCREENING DEVICE BASED ON MORE THAN ONE SET OF FACTORS

BACKGROUND OF THE INVENTION

1. Field of the Invention

The present invention relates to a method and an apparatus for controlling a screening device which serves for screening exterior light illuminating a room from the outside. In particular, the invention relates to a method and an apparatus for controlling blinds or shutters of a room.

2. Description of the Related Art

Blinds or shutters serve on the one hand to prevent dazzling in the case of direct incidence of sunlight or in general in the case of strong exterior lighting, so that even in the vicinity of windows is possible to work without being dazzled. Further, in the case of direct incidence of sunlight, blinds prevent a too strong heating of the room.

Because of the increasing prevalence of work with computer screens in particular the factor of dazzle-free working is of great significance. For this reason, as is known, the blinds of a room are often closed immediately upon a first occurrence of dazzling. Then, as a rule, the blinds remain closed for the whole day, so that for the whole day artificial light is needed for illuminating the room. There was thus developed a method, described in EP 94 119 424, for setting the total light in a room, and an apparatus for carrying out this method, with which energy consumption can be minimized. In accordance with EP 94 119 424, not only is the interior lighting of the room dimmed in dependence upon the level of natural lighting, but also a screening device of the room, such as e.g. a blind, is controlled in dependence upon the natural light in accordance with predefined control functions, so that the natural light is automatically dimmed by means of the screening device. There was thus realised a blind control which on the one hand permitted an extensive exploitation of the natural light and on the other end provided always for dazzle-free working.

This blind control does not, however, take into account factors relating to climate. Through windows and blinds there occurs, however, a considerable temperature exchange with the environment, which by means of the setting of the blinds can be controlled within certain limits. Thus, by closing the blinds, for example a warming up of the room through the incidence of sunlight, or a cooling during the night, can be reduced. If the blind control were now configured only with regard to these factors, the energy consumption for the heating/cooling of the room could be correspondingly reduced and the comfort for a person present in the room could be increased. On the other hand, such a kind of blind control cannot ensure that working in the room is always dazzle-free.

SUMMARY OF THE INVENTION

Thus, the object of the invention is to indicate a method and an apparatus for controlling a screening device for screening exterior light illuminating a room from the outside, whereby the energy consumption for heating or cooling of the room is minimized, whilst adequate comfort is provided in the room, i.e. whereby consideration is given to factors of climate in the control of the screening device.

This object is achieved, in respect of the method aspect of the invention, by determining a first setting position for the screening device in dependence upon first parameters which do not relate to climate factors, determining a second setting position for the screening device in dependence upon second parameters which relate to climate factors, so that a particular interior temperature is attained in the room, establishing an actual set desired position for the screening device in dependence upon the first and second setting positions, on the basis of predetermined decision parameters, and setting the screening device to the set desired position. In respect of the apparatus aspect of the invention, this object is achieved by providing a device for determining a first setting position for the screening device in dependence upon first parameters which are not related to climate factors, providing a device for determining a second setting position for the screening device in dependence on second parameters relating to climate factors, so that a particular interior temperature can be attained in the room and providing a device for establishing an actual set desired position for the screening device in dependence upon the first and second setting positions on the basis of predetermined decision parameters and having a setting number for setting the screening device to the set desired position.

In accordance with the invention, initially a first optimum setting position for the screening device is determined exclusively on the basis of first parameters. These first parameters can be predetermined by an operating person and may correspond for example to pre-defined positions for the screening device. In particular, these first parameters can also be parameters relating to lighting factors, such as e.g. the intensity of the exterior light, the position of the sun or the angle of the incident light, the orientation of the window relative to the sun etc. Likewise, there is determined a second optimal setting position for the screening device exclusively on the basis of factors relating to climate, such as e.g. the interior temperature, the outside temperature, the intensity of the exterior light, the heating or cooling power in the room, or particular thermal coefficients of the screening device or the window. Thus, on the one hand there is determined for the screening device, e.g. a blind, the optimal position from the point of view of the operating person or from the point of view of lighting factors, and on the other hand there is determined the optimal position from the point of view of factors of climate. Here, the term "position", is to be interpreted in dependence upon the type of screening device. In the case of fabric blinds, there is be understood by the term "position" the position of the lower edge of the blind in relation to the window, on the other hand with regard to strip blinds there is to be understood the position of the lower edge of the blind and the angle of setting of the strips.

From the two determined setting positions there is then selected the position to be preferred with regard to certain decision parameters or decision rules and the screening device is correspondingly controlled. Likewise, however, a compromise position can be established, which as far as possible does justice to the two determined "optimum" setting positions. Thereby, the decision is always effected such that on the one hand user comfort with regard to dazzling and interior temperature in the room is optimum, and on the other hand the energy consumption for the lighting and heating/cooling of the room is minimized.

In accordance with a first exemplary embodiment of the invention, the "optimum" setting positions are respectively weighted. The weighting for each determined setting position is thereby higher the more desirably the corresponding position should be set. In the final decision concerning the actual desired setting position for the screening device, the respective optimum setting positions, from the point of view of the operating person or from the point of view of lighting factors, and from the point of view of climate factors, are compared and an attempt is made to find a compromise solution which is satisfactory for the two desired positions. If no compromise solution can be found, as the final set desired position for the screening device there is selected that position which has the greater weighting.

In accordance with the second exemplary embodiment, there is selected as the final set desired position for the screening device always the optimum position from the point of view of climate factors, when no person is present in the room. When a person is present, there is always selected the optimum setting position from the point of view of lighting factors or from the point of view of the operating person, since then a dazzle-free working is always possible in the room and/or the wishes of the person present in the room can be most nearly satisfied. If, independently of the position of the screening device, no dazzling can occur in the room (e.g. in the case of a strongly clouded sky), that setting position is determined which requires the least energy use for the interior lighting and the heating/cooling of the room. Likewise also with this exemplary embodiment, the determined setting positions can be weighted, whereby in the case of the presence of a person in the room the most highly weighted setting position is selected.

Advantageously, there can be linked with the control means in accordance with the invention also a control circuit for setting the artificial light illuminating the room, in order to control the artificial light illumination in dependence upon the setting of the screening device. Likewise, the control means can be linked with a heating/ventilation and climate control unit, in order to take into account the setting of the screening device in the temperature regulation of the room or to provide desired temperature value.

In accordance with a preferred configuration of the invention at least the determination of the optimal setting position from the point of view of climate factors is effected in accordance with the rules of fuzzy logic. If the optimum setting position from the point of view of the operating person or from the point of view of lighting factors, and the final set desired position for the screening device, is determined in accordance with the rules of fuzzy logic, a further improved and very exact control of the screening device, which is also oriented towards the actual conditions and the needs of the persons in the room, is possible.

The subclaims indicate further advantageous configurations of the invention.

BRIEF DESCRIPTION OF THE DRAWINGS

The invention will be described below with reference to a preferred exemplary embodiment and with reference to the drawings. There are shown:

FIG. 1 a block diagram which illustrates a preferred exemplary embodiment of the apparatus in accordance with the invention, FIGS. 2a, 2b and 2c which are tables illustrating decision rules for an exemplary realisation of the first exemplary embodiment of the invention with the aid of fuzzy logic, FIG. 2d which is a graph relating to the determination of weighting in the case of a spontaneous action of an operating person on the control of the screening device in accordance with the first exemplary embodiment of the method in accordance with the invention, FIGS. 3a, 3b and 3c are tables which illustrate decision rules for an exemplary realisation of the second exemplary embodiment of the method in accordance with the invention with the aid of fuzzy logic.

DETAILED DESCRIPTION OF THE PREFERRED EMBODIMENT

FIG. 1 shows a room illuminated through a window 14 by exterior light 2. For further illumination there is provided an artificial light source 9 in the room 1. There serves for dimming the incident exterior light a screening device 3, such as e.g. a blind. The position of the blind is set by means of a setting member 13 which is controlled from a control circuit 7.

The control circuit 7 includes three devices 4, 5 and 6 for determining the set desired position of the blind 3.

The device 4 determines the optimum position of the blind 3 from the point of view of lighting factors, so that in the room 1, with the best possible exploitation of the exterior light 2, dazzle-free working is always possible. For this purpose there are delivered to the device 4 various parameters a, b, c relating to lighting factors, such as e.g. the intensity of the exterior light 2, the position of the sun or the orientation of the window 14 with regard to the sun. The intensity of the exterior light is detected by means of an exterior light sensor 15.

The device 5 determines the optimal position for the blind 3 from the point of view of climate factors, so that in the room 1 the energy employed for attaining a particular temperature is minimized. For this purpose there are delivered to the device 5 various parameters d, e, f relating to climate factors, such as e.g. the interior and exterior temperature, the intensity of the exterior light or particular thermal coefficients of the window 14 or of the blind 3. The interior and/or exterior temperature is detected by a temperature sensor 11.

The device 6 determines the final set desired position for the blind 3 in dependence upon the "optimal" setting positions determined by means of the devices 4 and 5 from the point of view of lighting factors and from the point of view of climate factors. The device 6 decides which of the two "optimum" setting positions is selected or establishes a compromise position for the control of the blind 3. This decision is always made such that on the one hand in the room 1 user comfort is optimum with regard to room temperature and dazzle-free working and on the other hand that the energy consumption for the artificial lighting and the heating/cooling of the room 1 is minimum. The determination of the final set desired position for the blind 3 by means of the device 6 may be effected in accordance with the following exemplary embodiments:

Advantageously, an operating person can influence the control process of the apparatus shown in FIG. 1, in order to be able to establish desired set positions in accordance with their wishes. For this purpose there may be stored in the control circuit 7 pre-defined set positions or the operating person can set a wished for set desired position manually. In order to evaluate the set positions predetermined by an operating person, there may provided along with the devices 4 and 5 a further evaluation device for evaluation of the operating person data. Equally, the evaluation of this operating person data can be carried out for example by means of the device 4, which then evaluates the operating person data instead of or in addition to the lighting factor data.

In accordance with a first exemplary embodiment, the devices 4 and 5 indicate along with the optimal setting positions—from the point of view of the user or from the point of view of lighting factors or from the point of view of climate factors—also a weighting for the corresponding setting position. This weighting is higher the more important it is that the respective setting position should be adopted. Thus, for example the device 5 delivers for the blind the setting position "closed" with a very high weighting on a warm summers day with direct incident sunlight, since from the point of view of climate factors the need to close the blind 3 is very strong. In the event that setting positions are predetermined by an operating person, two cases are to be differentiated. If pre-defined setting positions are stored in the control circuit 7 then each setting position can be provided with a stored weighting, which is read out with the desired setting position. In contrast, if the operating person spontaneously influences the control process of the device shown in FIG. 1, the weighting is determined in accordance with the time-dependent weighting function illustrated in FIG. 2d, whereby the weighting decreases with the passage of time. That is, as the operating person exercises influence at an increasingly later point of time, a lower weighting is attributed to their desired setting position. It is, however, also conceivable that the operating person may indicate by hand the weighting for their desired setting positions. Likewise it is conceivable that an operating person can indicate the weighting or the optimum position from the point of view of lighting factors or from the point of view of climate factors.

The device 6 compares the setting positions delivered by the devices 4 and 5 and attempts to find a compromise solution which does justice to both wishes. This is, e.g., possible with a screening device having strip blinds even with different wished for positions from the devices 4 and 5, since the setting position "closed" from the point of view of climate factors and the setting position "half open" from the point of view of lighting factors can be realized simultaneously by means of an appropriate setting angle of the blind strips. If, however, no compromise solution can be found, the device 6 chooses as final set desired position for the blind 3 that setting position of the devices 4 and 5 which has the greater weighting.

As described above, the weighting of the two setting positions delivered from the devices 4 and 5 can for example be set by a user. In this way, it is possible to store and to call up pre-set operating conditions for the blind 3, the interior lighting 9 and a heating, ventilation and climate control unit 10 with corresponding weighting for the dazzle prevention and climate maintenance functions of the individual operating conditions. A corresponding system for the selection of different pre-set operating conditions is known for example from Utility Model G 94 12 900.2.

Advantageously at least the device 5 is constituted for determining the optimal setting position from the point of view of climate factors in accordance with the rules of fuzzy logic. Fuzzy logic works with imprecise statements. The input parameters of the fuzzy logic are quantified, i.e. for each parameter only particular value ranges are permitted. The quantification of the parameters is effected in accordance with so-called association functions, whereby there is allocated to the actual value of an input parameter a corresponding value range in accordance with its association function and a corresponding truth value (degree of satisfaction). The quantified input parameters are, together with their truth values, combined in accordance with particular decision rules, so that an output parameter—likewise quantified—can be derived, which is then transformed into a concrete output parameter in accordance with a particular method (defuzzification). The basic principles of fuzzy logic are described for example in the report "Technology Profile Fuzzy Logic", Marcello Hoffmann, SRI International, June 1994. In the case of the device 5 there can thus be employed as quantified input parameters the interior or exterior temperature, the intensity of the exterior light, the cooling or heating power of a heating/ventilation and climate control unit 10 present in the room 1, or thermal coefficients of the blind 3 or of the window 14. Likewise, there can be taken into consideration for the control the actual position of the screening device. The output parameter of the device 5 is, after defuzzification has been effected, the setting position for the blind 3.

In analogous manner, the further devices 4 and 6 can be constituted as fuzzy controllers.

In FIGS. 2a to 2c there is illustrated an example of the realization of the first exemplary embodiment with the aid of fuzzy logic for the determination of the optimum setting position from the point of view of climate factors. There are evaluated as quantized input parameters or input variables the interior temperature (value ranges: cold, pleasant and medium) the incident light power (low, medium and high), the actual position of the screening device (closed, medium and open), the outside temperature (cold, pleasant and warm) and the heating power in the room (negative, zero and positive). A negative heating power of the heating/ventilation and climate control unit 10 corresponds to a cooling of the room. Since five input variables are evaluated, a total of $3^5=345$ different decision rules should be necessary, since each input variable can take three different values. The number of the decision rules is, however, reduced in that in accordance with FIG. 2a and 2b in each case three or two input variables are combined with different decision rules, whereby there is associated with each combination of the corresponding input variables a particular value for the change of the screening device (downwards, somewhat downwards, unchanged, somewhat upwards, upwards). The output parameters determined in accordance with FIG. 2a and FIG. 2b are then combined in accordance with an arbitrarily definable decision logic to provide a final setting value for the screening device.

The weighting of the setting position which is thus optimum from the point of view of climate factors is effected for example on the basis of the quantified values for the incident light power and the heating power in the room to be screened. As can be seen from FIG. 2c, in this way the weightings are also available in quantified forms.

It is apparent that with appropriate increase of the possible values of the input and output parameters, and of the weighting, the precision of the control of the screening device can be increased as desired.

In accordance with the second exemplary embodiment the device 6 always selects the optimum setting position from the point of view of climate factors delivered by the device 5, when no person is present in the room 1. If, on the other hand, a person is present, the device 6 selects the optimum setting position from the point of view of the operating person or from the point of view of lighting factors of the device 4, since primarily freedom from dazzle must be ensured in the room or the wishes of the operating person must be complied with. If, however, independently of the position of the blind 3, dazzle-free working is made possible in the room 1, e.g. in the case of strongly clouded sky or corresponding arrangement of computer screen work stations, then the device 6 establishes as the final set desired position for the blind 3 a setting position which with regard to the artificial interior lighting and the necessary heating/cooling of the room 1 requires the least expenditure of energy. This setting position thus corresponds as a rule to the setting position delivered by the device 5. The presence and absence of a person can be detected by means of a movement sensor 12 which supplies to the device 6 a corresponding signal i.

Likewise the determined setting positions can also in this exemplary embodiment be weighted, whereby in the case of the presence of a person in the room the setting position of greater weight is selected. If no person is present in the room, then—as described above—the optimum setting position from the point of view of climate factors is selected.

In FIG. 3a there is indicated an example of the realisation of the second exemplary embodiment with the aid of fuzzy logic for determining the optimum setting position from the point of view of climate factors. The desired setting position of the screening device 3 from the point of view of climate factors is thereby determined in accordance with the aimed-for thermal balance of the corresponding window 14. For the thermal power balance $P_F$ of the window 14, the following formula applies:

$$P_F = P_{F1} + P_{F2} - P_V.$$

There, $P_{F1}$ corresponds to the thermal power increase due to the irradiation of the non-screened region of the window 14, $P_{F2}$ corresponds to the thermal power increase due to the irradiation of the screened region of the window 14 and $P_V$ to the thermal power loss from the room 1 to the exterior through the window 14 and the screening device 3. The thermal power balance $P_F$ of the window is the main output variable of the device 5, whereby the optimum setting position for the blind 3 from the point of view from the climate factors is derived from the determined thermal power balance value. This manner of proceeding permits a reduction of the necessary fuzzy parameters and restricts itself to significant factors only. Thereby, the aimed-for thermal power balance value is determined and then that setting position selected which most nearly suits the thermal power balance value of the window. The thermal power balance value is in turn determined on the basis of particular input parameters with the aid of fuzzy decision rules, whereby the decision rules are so constructed that by means of the setting position of the screening device resulting therefrom the heating/ventilation and climate control unit 10 is supported, i.e. the screening device should facilitate the warming of the room 1 in the case of heating by means of the heating/ventilation and climate control unit 10, or facilitate its cooling when the room 1 is being cooled. Advantageously the determination of the aimed-for thermal power balance value is effected in dependence upon the seasons of the year.

As input variables for the determination of the thermal power balance value there are thus employed, in quantised form, the season (value ranges: winter, transitional period and summer) and the heating power (negative, zero or positive). As can be seen from FIG. 3a, each combination of these input variables is associated with a particular quantised and desired thermal power balance value (value ranges: negative, zero, somewhat positive, positive and very positive). A negative thermal power balance thereby means an aimed-for thermal transfer from the interior of the room through the window to the exterior. The cases marked with (*) should, for a good climate control, not appear in practice. The heating power dependent determination of the thermal power balance value exhibits the advantages that there is always prevented a setting of the screening device 3 which works against the operating mode of the heating/ventilation and climate control unit 10. The control circuit 7 configured in this way can moreover be coupled with any desired heating/ventilation and climate control unit 10. The season of the year can be determined by means of the formation of a mean value of the exterior temperature over a long period of time.

The setting position for the screening device 3 which is optimum from the point of view of climate factors is that setting position which corresponds to the desired thermal power balance value of the window 14. For this purpose, the setting position is derived from the above formula. If the aimed-for thermal power balance value cannot be attained through any setting position, then there is selected as the setting position that position which most nearly meets the desired thermal power balance value.

In FIG. 3b and 3c there is indicated an example of the realization of the second exemplary embodiment with the aid of fuzzy logic for determining the optimum setting position from the point of view of lighting factors. There are employed as quantified input variables the angle of incidence of the exterior light 2 to the window 14 and the direct intensity of the perpendicularly incident light. Each combination of these input variables has associated with it, with the aid of the indicated decision rules, a particular value for the setting position of the screening device 3. Thereby, in FIG. 3b and FIG. 3c, a distinction is made between the cases of a less defuse incidence of light and a more defuse incidence of light. The decision rules employed in FIG. 3b and 3c are oriented towards the following factors: for avoiding dazzle effects, direct incidence of a sunlight should be prevented. Despite this, for the illumination of the room, a proportion of a exterior light 2 which is as high as possible should be employed and the number of movements of the screening device 3 should be held as small as possible.

Analogously to the first exemplary embodiment, the final desired set position for the screening device is selected by means of the device 6 from the setting positions determined in accordance with FIG. 3a or FIGS. 3b, c. The selection is effected as described above. In the case of the presence of a person in the room, the optimum setting position from the point of view of lighting factors is selected, whilst the optimum setting position from the point of view of climate factors is selected when no person is present in the room.

With the device 6 or the control circuit 7 there may be connected a control circuit 8 for setting the interior lighting 9 in dependence upon the set desired position for the blind 3 determined by means of the device 6, so that the artificial light can always be set in correspondence with the external light falling into the room 1. If the device 6 or control circuit 7 is connected with the heating/ventilation and climate control unit 10, the setting of the blind 3 can be taken into account in the heating and/or cooling power or there can be set desired temperature values for the interior temperature.

Particularly advantageous is the connection of the control circuit 7 in accordance with the invention to a building control system (not shown), so that there can be taken into account data related to the building as a whole or decision parameters g, h, which are not substantially dependent upon the exterior light 2, for the determination of the set desired position for the blind 3 by means of the device 6. Thus, for example, there can be predetermined for the building as a whole the operating time for the employment of the blind 3 or it can be sent to the device 6, so that independently of the desired positions of the devices 4 and 5 the blinds are always closed at night for reasons of security or are always open in the case of storms.

We claim:

1. A method of controlling a screening device for screening exterior light illuminating a room from the outside, said method comprising the steps of:

a) determining a first optimum setting position for the screening device by processing, in a first processing device, first parameters which do not relate to climate factors so that a particular condition, other than a climatic condition would be attained in the room, b) separately determining a second optimum setting position for the screening device by processing, in a second processing device, second parameters relating to climate factors, so that a particular interior temperature would be attained in the room, c) thereafter, establishing an actual set desired position for the screening device in dependence solely upon the first position which was determined in step a) and the second position that was determined in step b) by weighting the first and second optimum setting positions and processing them, on the basis of predetermined decision parameters, and d) setting the screening device to the actual set desired position established in step c).

2. A method according to claim 1, characterized in that, the first parameters include parameters relating to lighting factors, and in that the first setting position for the screening device is so determined that on the one hand there is avoided in the room a dazzling by the exterior light and on the other hand the exterior light is utilized for the illumination of the room.

3. A method according to claim 1, characterized in that; the first parameters include parameters determined by an operating person.

4. A method according to claim 3, characterized in that; said first parameters determined by said operating person are recalled from a memory.

5. A method according to claim 1, characterized in that; the first parameters include at least one of the group consisting of the intensity of incident exterior light, the position of the sun, and the angle of incidence of the incident exterior light with regard to a window of the room illuminated by the exterior light; and in that the second parameters relating to climate factors include at least one of the group consisting of the interior temperature of the room, the temperature exterior of the room, the intensity of incident exterior light, the position of the sun, the heating power of a heating control unit, the cooling power of a cooling unit, the ventilation of a climate control unit of the room, the actual position of the screening device and the season of the year.

6. A method according to claim 1, characterized in that; the second optimum setting position is so determined on the basis of the second parameters relating to climate factors; that the screening device in the second optimum setting position assists at least one of the group consisting of the heating function of a heating control unit, the cooling function of a cooling unit, and the ventilation of a climate control unit of the room in a manner which maintains a desired climate in said room.

7. A method according to claim 6, characterized in that; starting from one of a heating or cooling power of a heating control unit and a ventilation or climate control unit of the room there is determined a desired thermal power balance value for the thermal transfer of a window of the room being screened by the screening device, and in that the second optimum setting position is derived from a desired thermal power balance value.

8. A method according to claim 1, characterized in that; the screening device is a blind.

9. A method according to claim 1, characterized in that; in step c) the actual set desired position for the screening device is so determined that said actual set desired position represents an optimum compromise between the first and second setting optimum positions determined in steps a) and b).

10. A method according to claim 1, characterized in that; said room is provided with interior lighting and the interior lighting of the room is controlled according to the actual set desired position of the screening device as determined in step c).

11. A method according to claim 1, characterized in that; in step c), the determination of the actual set desired position is carried out in further dependence on additional parameters which are independent of the exterior light.

12. A method according to claim 1, characterized in that; in step c) there is determined as the actual set desired position for the screening device a position which is based upon both the first and the second optimum determined setting positions, or in that in step c) as the actual set desired position for the screening device there is selected that position of the first and second setting positions which has the greater weighting.

13. A method according to claim 1, characterized in that; the weighting for the first and second optimum setting positions is predetermined by an operating person.

14. A method according to claim 1, characterized in that; in step c) there is established as the actual set desired position for the screening device the first optimum setting position determined in step a) when a person is present in the room; and in that in step c) there is established as the actual set desired position for the screening device the second optimum setting position determined in step b) when no person is present in the room.

15. A method according to claim 14, characterized in that; in step c) there is established as the actual set desired position for the screening device the first optimum setting position at which dazzling by exterior light cannot arise in the room.

16. A method according to claim 1, characterized in that; at least step b) is carried out in accordance with the rules of fuzzy logic.

17. A method according to claim 1, characterized in that, in step c) as the actual set desired position for the screening device there is selected that position of the first and second optimum setting positions which has the greater weighting.

18. Apparatus for controlling a screening device for screening exterior light illuminating a room from the outside, said apparatus comprising:

a first processing device for determining a first optimum setting position for the screening device by processing first parameters which do not relate to climate factors so that a particular condition, other than a climactic condition, would be attained in the room;

a second processing device for separately determining a second optimum setting position for the screening device by processing second parameters relating to climate factors, so that a particular interior temperature would be attained in the room;

a third processing device for establishing an actual set desired position for the screening device in dependence upon both the first optimum setting position that was determined by the first processing device and the second optimum setting position that was determined by the second processing device, by weighting the first and second optimum setting positions and processing them on the basis of predetermined decision parameters; and a setting member for setting the screening device to the actual set desired position established by said third processing device.

19. Apparatus according to claim 18, characterized in that;

the first parameters include parameters relating to lighting factors; and in that the processing device for determining the first optimum setting position determines the first optimum setting position for the screening device.

20. Apparatus according to claim 18, characterized in that;

the first parameters include parameters which can be predetermined by an operating person to obtain a predetermined setting position for the screening device.

21. Apparatus according to claim 20, wherein said apparatus includes:

a memory in which the parameters predetermined by the operating person are stored.

22. Apparatus according to claim 18, characterized in that:

the first parameters include at least one of the group consisting of the intensity of incident exterior light, the position of the sun and the angle of incidence of the incident exterior light with regard to a window of the room illuminated by the exterior light; and in that the second parameters relating to climate factors include at least one of the group consisting of interior temperature of the room, the outside temperature, the intensity of incident exterior light, the position of the sun, the heating power of a heating control unit, the cooling power of a cooling unit, the ventilation of a climate control unit of the room, the actual position of the screening device and the season of the year.

23. Apparatus according to claim 18, further including:

a detection device for detecting the illumination intensity of incident exterior light; and a detection device for detecting the exterior and/or interior temperature of the room.

24. Apparatus according to claim 18, wherein:

the processing devices for determining the first and second optimum setting positions and the processing device for establishing the actual set desired position are integrated in a control circuit.

25. Apparatus according to claim 18, wherein:

the processing device for establishing an actual set desired position is connected with a control circuit for setting the interior illumination of the room in dependence upon the particular actual set desired position.

26. Apparatus according to claim 18, wherein:

the processing device for establishing the actual set desired position is connected with at least one of the group consisting of a heating control unit, a cooling unit and a ventilation control unit and a climate control unit for setting the heating, ventilation and climate control of the room in dependence upon the particular actual set desired position.

27. Apparatus according to claim 26, wherein:

the processing device for determining the second setting optimum position on the basis of the second parameters relating to climate factors determines the second optimum setting position.

28. Apparatus according to claim 18, wherein:

the first and second optimum setting positions are weighted; and in that the processing device for establishing the actual set desired position for the screening device establishes a position which based upon both the first and the second determined optimum setting positions, selects that position of the first and second optimum setting positions which has a predetermined greater weighting.

29. Apparatus according to claim 28, wherein:

the weighting for the first and second optimum setting positions can be predetermined by an operating person.

30. Apparatus according to claim 18, wherein:

the processing device for establishing the actual set desired position as the set desired position for the screening device selects the first optimum setting position when a person is present in the room; and in that the processing device for establishing the actual set desired position as the set desired position for the screening device selects the second optimum setting position when no person is present in the room.

31. Apparatus according to claim 30, wherein:

said apparatus includes a movement sensor which monitors for the presence of a person in the room.

32. Apparatus according to claim 18, wherein:

the processing device for establishing the actual set desired position as the actual set desired position for the screening device selects the second optimum setting position when no dazzling by exterior light occurs in the room, irrespective of the position of the screening device.

33. Apparatus according to claim 18, wherein:

at least the device for determining the second optimum setting position is formed as a fuzzy logic controller.

34. Apparatus according to claim 18, wherein:

the first and second optimum setting positions are weighted; and wherein the processing device for establishing the actual set desired position for the screening device selects that position of the first and second optimum setting positions which has the greater weighting.

* * * * *